United States Patent
Kanngiesser et al.

[11] 3,949,291
[45] Apr. 6, 1976

[54] SHORT HVDC TRANSMISSION SYSTEM WITH POWER FACTOR CONTROL

[75] Inventors: Karl-Werner Kanngiesser, Viernheim; Dietrich Kluge, Mannheim-Rheinau, both of Germany

[73] Assignee: BBC Aktiengesellschaft Brown, Boveri & Cie., Baden, Switzerland

[22] Filed: Nov. 13, 1974

[21] Appl. No.: 523,524

Related U.S. Application Data

[63] Continuation of Ser. No. 95,556, Dec. 7, 1970.

[30] Foreign Application Priority Data
Dec. 11, 1969   Germany............................ 1962042

[52] U.S. Cl.................................. 323/105; 321/2
[51] Int. Cl.² ........................................... G05F 1/68
[58] Field of Search ................. 321/4, 2, 18, 19, 40; 323/102, 105

[56] References Cited
UNITED STATES PATENTS 3,275,838   9/1966   Almstrom .............................. 321/4
3,339,083   8/1967   Uhlmann ................................ 321/2
3,470,442   9/1969   Ainsworth............................. 321/9
3,543,129   11/1970  Boksjo ................................... 321/4

FOREIGN PATENTS OR APPLICATIONS 1,147,741   4/1969   United Kingdom................. 323/105
1,962,042   6/1971   Germany............................. 321/27 R

OTHER PUBLICATIONS

IEEE Transactions on Power Apparatus and Systems, Vol. PAS–89, No. 6, pp. 1120–1125, July/Aug. 1970.

Primary Examiner—William M. Shoop
Attorney, Agent, or Firm—Pierce, Scheffler & Parker

[57]         ABSTRACT

A method and apparatus for regulation of the power factor of a 3-phase network fed with power from another 3-phase network via a short high-voltage direct current transmission link interconnecting the two networks. The d.c. transmission link includes rectifier and inverter stations connected at opposite ends of the link and the inverter station is controlled in such manner as to supply power to the fed network at a variable leading power factor in dependence upon the actual power factor of the fed network.

3 Claims, 4 Drawing Figures

SHORT HVDC TRANSMISSION SYSTEM WITH POWER FACTOR CONTROL

This is a continuation of application Ser. No. 95,556, filed Dec. 7, 1970.

This invention relates to an improved method for regulating the power factor or the voltage of a high voltage direct current transmission i.e. a HV-DC transmission, particularly with a short DC line, and which is equipped with condensers and/or filter circuits on the three-phase current side of the inverter station for feeding variable active power into a three-phase network.

A high voltage direct current transmission serves to exchange active power between two three-phase networks of different intensity, or for feeding active power from a power supply plant into a three-phase network. A disadvantage of such a HV-DC connection is that the converters take from the generator, or the connected mains inductive reactive power which must be expended in the generator itself or by additional phase shifters, filter circuits and condenser batteries. In this connection, reference is made to provisional Swedish Pat. No. 306,785 and the Swiss magazine publication "Edigenossische Technische Zeitsschrift-Ausgabe A", Vol. 89 (1968) Nos. 8 and 9, pages 31–37. In order to be able to maintain the reactive power balance and thus the three-phase voltage under conditions of load variation, the connected three-phase networks must have a certain short-circuit power available which should exceed a 2.5 fold value of the rated HV-DC power.

The advantage of a HV-DC coupling over a three-phase coupling is mainly that it represents an asychronous connection which enhances the stability of the network system, and that it permits adaptation to the operating properties of the connected networks. The present fields of application of a HV-DC coupling are confined to setting the transmitted active power to a desired value, or to make it dependent upon operating variables of the networks. In this connection, reference is made to the Swiss magazine publication "Brown Boveri Mitteilingen", 3/69, p. 118. Such an operating variable is primarily the frequency which is maintained constant by varying the nominal active power value within an adjustable range. By means of a HV-DC coupling it was possible to achieve that the transmitted direct current power does not depend unilaterally upon the state of the network but rather the state of both coupled networks or those working in a system. The determination of the transmission power is taken over either by a central load distributing station which so sets the nominal power that the regulated operating variables of the three-phase networks do not exceed certain values, or by an automatic control device of the HV-DC system. While the active load behavior was thus of the greatest importance in the present HV-DC plants, the reactive load behavior was taken into account only insofar as condenser batteries and/or phase shifters were used to cover the reactive load consumption of the HV-DC stations and possibly of the fed network.

A primary object of this invention is to utilize the possibility principally existing in a HV-DC converter plant in order to influence, in addition to the active load behaviour, also the reactive load behavior by suitable control methods. In an extension of the present application of a HV-DC connection for feeding, or exchanging active power, the direct current transmission is to serve according to the invention additionally to set a certain power factor or a constant voltage by varying the reactive load behaviour. In order to influence the reactive load behaviour within a certain range, it is necessary to depart from customary regulating methods which are based upon variation of either the direct current or the direct voltage.

For the solution of the problem in accordance with the invention, the direct current and the direct voltage respectively are regulated in dependency of the power factor of the three-phase side of the inverter station such that the reactive load behaviour is regulated in an optimal range.

In the accompanying drawings.

Figure 1:
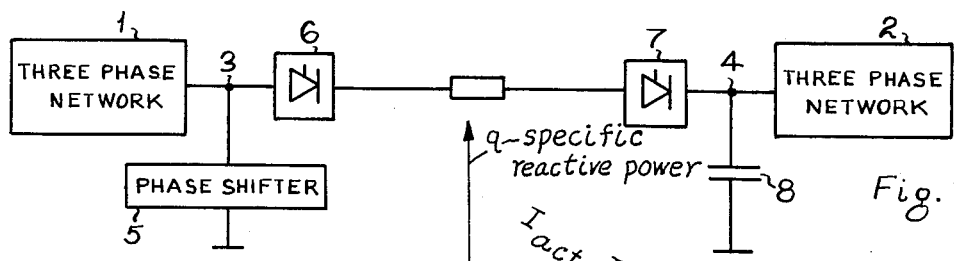
FIG. 1 represents in schematic circuit form, a HV-DC short coupling which will serve to illustrate the improved regulating method according to the invention.
Figure 2:
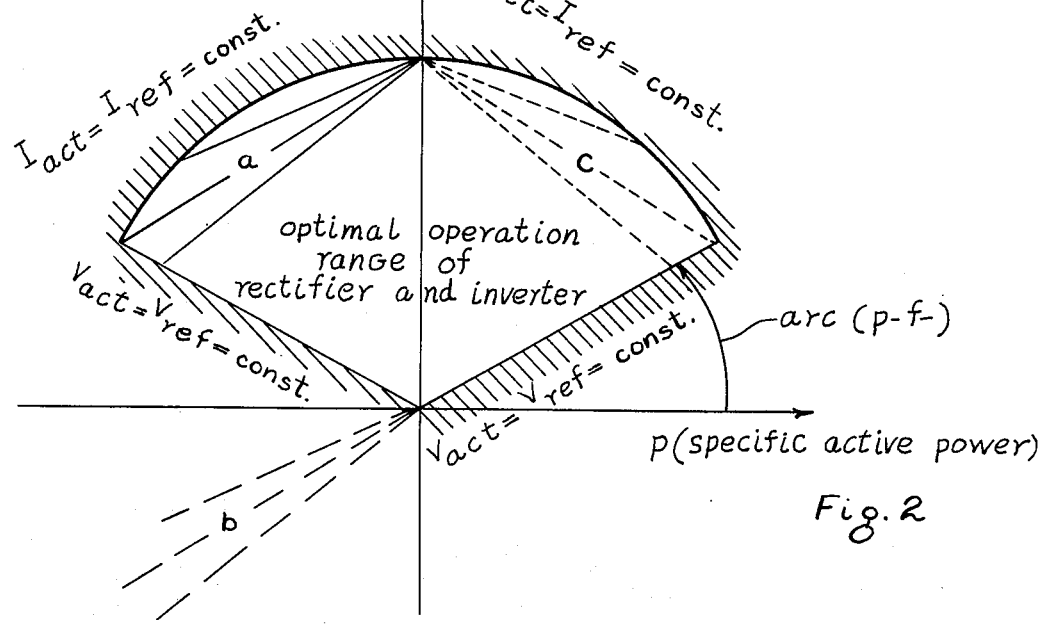
FIGS. 2 and 3 are graphs illustrative of the operational aspects of the coupling.

With reference now to FIG. 1, 1 and 2 represent respectively two three-phase networks which are interconnected by way of a HV-DC short coupling. If network 1, for example is considered as the feeding network, the three-phase alternating voltage supplied by it will be converted into direct current by rectifier 6, transmitted over the short coupling DC line to an inverter 7 where it will be re-converted into alternating current and then supplied to the fed network 2. Obviously the reverse arrangement will be provided when network 2 functions as the feeding station in which event, the converter element 7 then functions as the rectifier and the converter element 6 functions as the inverter. The voltage at point 3 between network 1 and converter 6 is maintained at a constant value, which is possible by means of correspondingly regulated phase shifters 5, or by the feeding three-phase network 1.

Point 4 between converter 7 and network 2 has connected to it a condenser battery 8.

For determination of the control characteristics according to the invention, equations of the specific reactive power $q$ related to the nominal active power $$P_{dn}, q = \frac{Q50\sim}{P_{ref.}}$$

are set up as a function of the specific transmission power $$P = \frac{P_{act}}{P_{ref.}}$$

and derived therefrom the operating ranges of the rectifier and inverter Q designates the reactive power of a 50 cycle network.

In the following $$\frac{I_{act}}{I_{ref}}$$

denotes the specific direct current $$v = \frac{V_{act\,i}}{V_{ref}}$$

denotes the direct specific voltage $V_{act\,i}$ = the ideal idle direct voltage at a rectifier and inverter, respectively, firing angle $\alpha = 0$ As equation $q = f(p)$ for constant direct current $I_{act} = I_{ref}$ = a constant one obtains a circle with the center in the coordinate origin and the radius $$r = \frac{V_{act\,i}}{V_{ref}}$$

of the form $$p^2 + q^2 = \left(\frac{V_{act\,i}}{V_{ref}}\right)^2 \qquad (1)$$

The equation $q = f(p)$ for constant voltage $V_{act} = V_{ref}$ = a constant results in the following:

$$q = \frac{V_{act\,i}}{V_{ref}} \cdot p \cdot \sqrt{1 - (\cos\gamma_{min} - dx_N)^2} \qquad (2)$$

wherein:
 $dx$ - inductive voltage variation related to $V_{act\,i}$
 $\gamma$ - extinction angle The optimal operating range of the rectifier 6 and inverter 7 indicated by the hatching in FIG. 2 is thus determined.

If an inverter, is to feed into a three-phase network with variable active power P but constant power factor (p.f.), for example, which is also substantially the function of a power plant generator, such a behavior can be represented by the operating lines $b$ in FIG. 2. These lines lie outside the operating range of the inverter. By a reactive power generator, for example, a condenser battery with a constant specific reactive power of $|q| = V_{act\,i}/V_{ref}$ at the point $p = 0$, the operating curves of an inverter of the course $a$ can be transposed into the desired operating lines $b$. Another function of the invention is therefore to find a control method for the inverter which yields the operating curves of the inverter extending with constant inclination by a shifting of direct current in dependency of the aberration $\Delta p.f.$ of the power factor. The term "constant inclination" means that the power factor p.f. is constant. For the sake of illustration three values have been assumed in FIG. 2 for reference values of the power factor p.f.$_{ref}$ for example, 0.8, 0.855, and 0.9. The broken lines $b$ lie in the third quadrant, which means that inductive reactive power is now delivered to the three-phase network on bus bar 4 with a constant power factor of the inverter.

The operating lines $a$ of the inverter can only be obtained, however, when certain pairs of values are given for the specific direct current $i$ and the specific direct voltage $V$. In order to obtain these values, an equation $q = f(v,i)$ is at first indicated, which applies to the variables $V_{act}$ and $I_{act}$ $$q = \frac{V_{act\,i}}{V_{ref}} \cdot i \cdot \sqrt{1 - [(\cos\gamma_{min} - dx_N)\,V]^2} \qquad (3)$$

Figure 3:
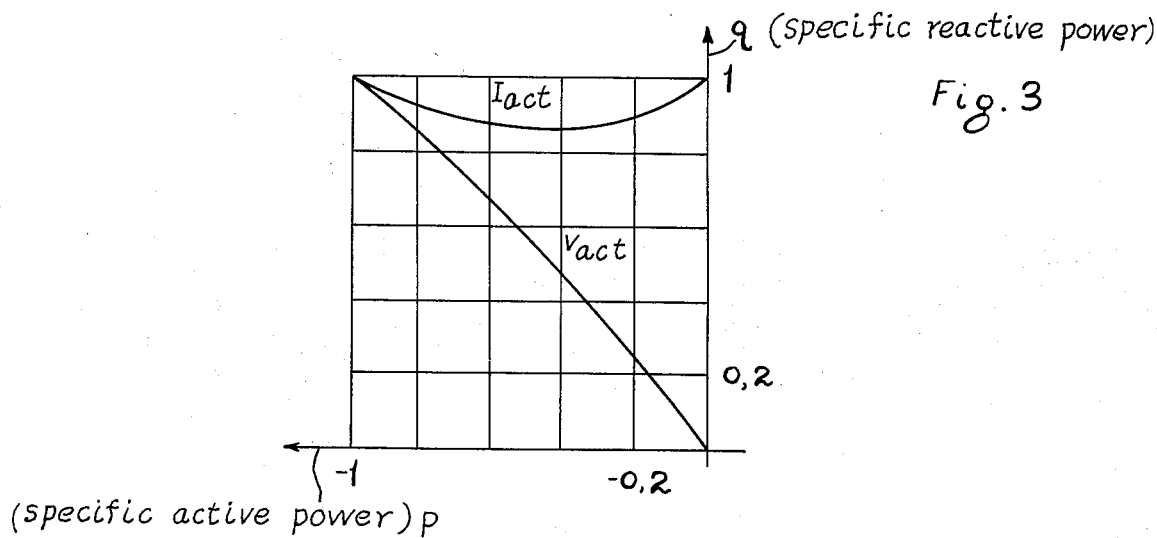

This equation is made to intersect with the line equations $a$ and one obtains the courses $i_{(p)}$ and $v_{(p)}$ represented in FIG. 3, which were calculated for the assumed example for p.f.$_{ref}$ = 0.855 of the inverter. This shows that a constant current method is substantially required.

In the presently used 1–2 transmissions, particularly in those with a great direct current (DC) line length, the constant voltage method was used primarily, i.e. the variation of the transmitted power was achieved by a variation of the direct current. At partial load, the full power losses therefore do not appear. The regulating method according to the present invention can be applied with advantage primarily in the case of a short coupling i.e. a HV-DC transmission with a short connecting line where the power losses do not play a substantial role, since the transmission current remains practically unchanged.

The value pairs $i_{(p)}$ and $v_{(p)}$ can be formed for example, according to equation (3) in a function-former in dependence on the nominal active power value and are fed as nominal current and voltage values to two regulators which then perform a simultaneous shift, not shown.

In another embodiment of the invention, the power regulator, which will be simpler in practice, presets only one manipulated variable, e.g. the direct voltage V as a reference value $V_{ref}$ for the direct voltage regulator, and permits the second manipulated variable, the direct current I, to follow by a further regulator, i.e. a power factor regulator FIG. 14. It is principally irrelevant in this case which of the two stations rectifier or inverter regulates the direct current and which the direct voltage.

With these direct voltage and direct current values preset by the regulator, one obtains the corresponding rectifier characteristics $c$, as seen in FIG. 2. It is further possible that a controlled phase shifter 5 connected to bus bar 3 is provided by which an automatic regulation of the power factor of the feeding three-phase network can be obtained by variation of its delivery of reactive power into the network. Such regulation can be by the equipment of the phase shifter with a voltage or power factor regulator.

The unfavorable reactive power behavior of the reactifier can further be improved if a step switch for stepwise tapping the converter transformer is used for regulating the power factor in the feeding three-phase network.

In the derivation of equation (3), it has been assumed at first that the three-phase voltage on bus bar 3, and the three-phase voltage on the valve side are kept constant which is possible by correspondingly regulating phase shifters 5. Now, it is assumed that the three-phase voltage on the valve side can be varied by means of a stepwise tapping of the converter transformer. With this measure, it is possible to influence in a favorable manner the reactive power consumption of the rectifier and also the power factor of the feeding network. For this purpose, the tapping point is controlled by the output of a power factor regulator.

It is possible in this manner to achieve a stepwise adaptation to a desired power factor. The unfavorable behaviour of the rectifiers, which is characterized by the dropping lines c in FIG. 2 can be so improved within a certain range, which is determined by the setting range of the step switch, that the reactive power consumption of the rectifier does not rise, as before, with descreasing active power, but likewise descreases.

The reactive power behaviour of the rectifier can be further improved if one imagines instead of the feeding three-phase network 1, a power plant feeding over a long three-phase line. In this case, the reactive power behaviour on the bus bar of the power plant is of greater interest, which can be so varied by means of phase shifter 5 that it is possible to work there with a constant voltage or with a constant power factor, preferably with the power factor.

Figure 4:
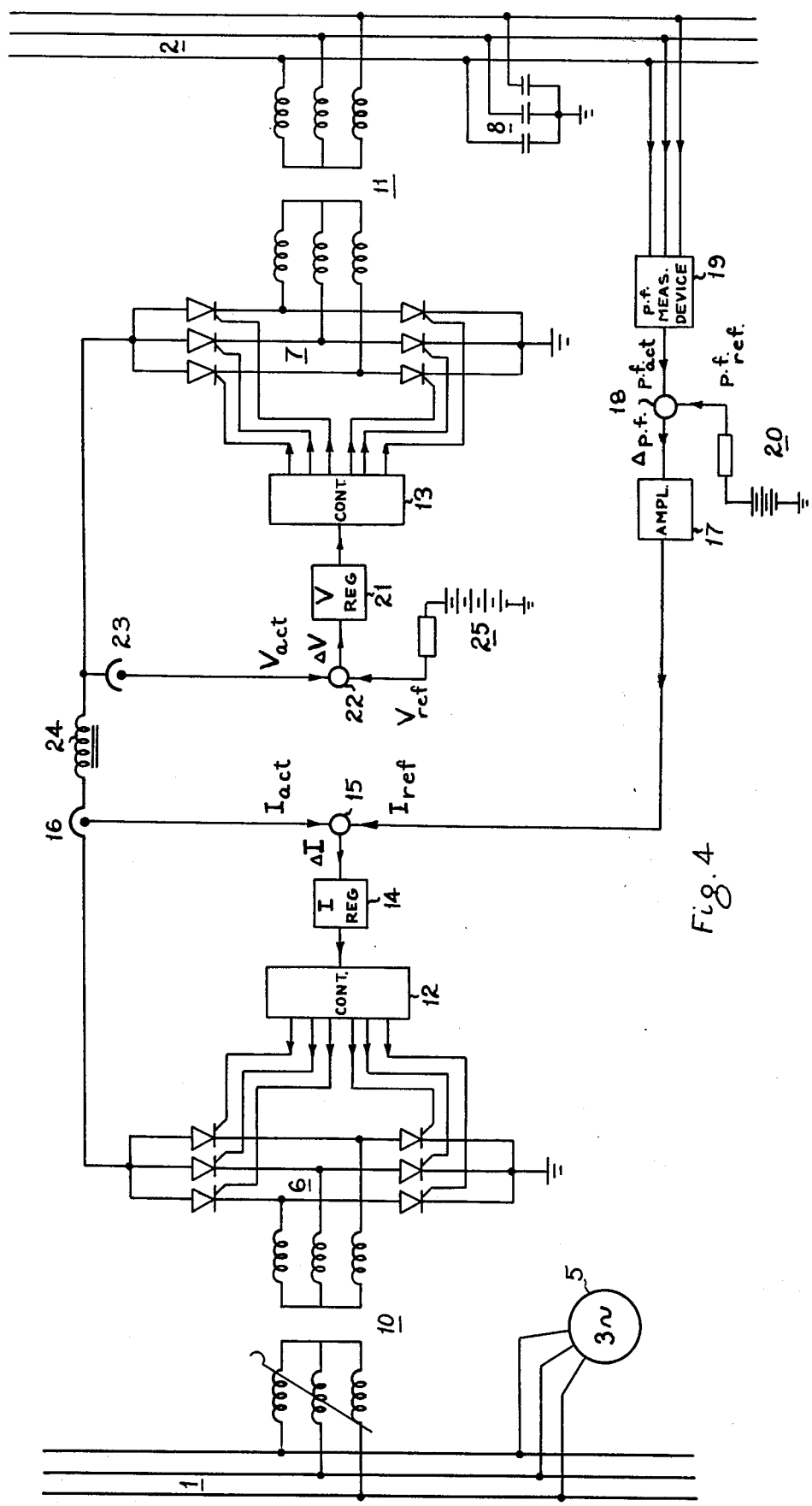
FIG. 4 is a more detailed circuit diagram of the coupling shown in FIG. 1.
Figure 1:
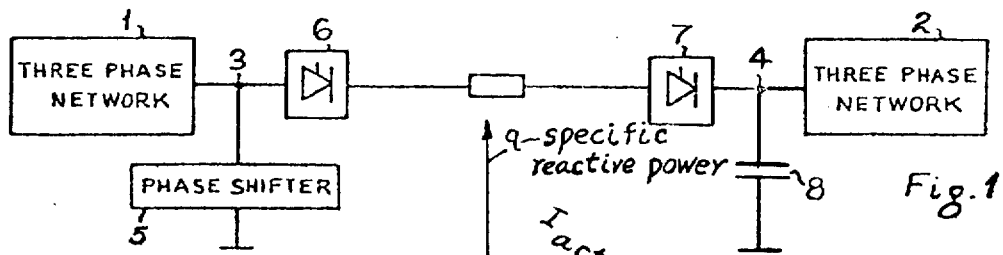
Figure 2:
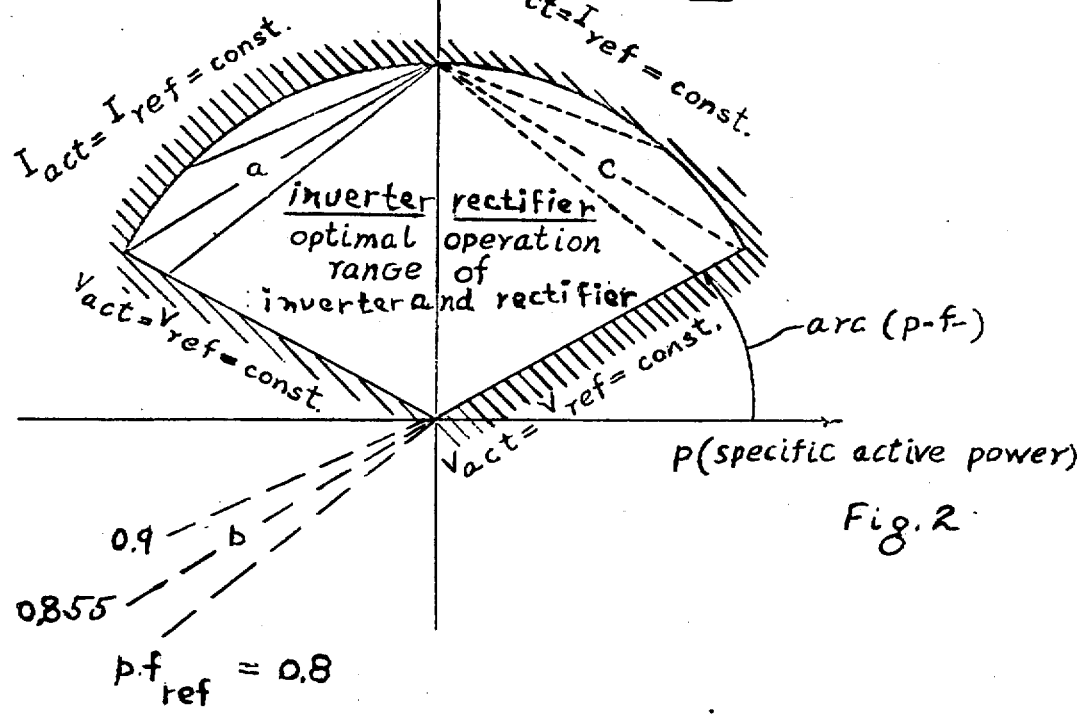
Figure 3:
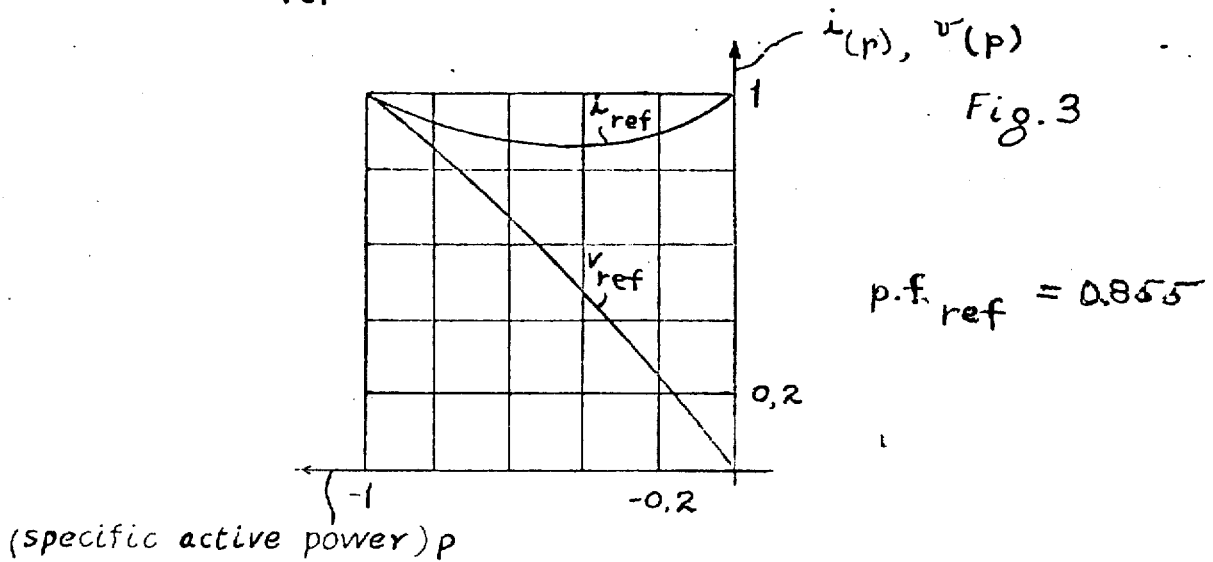

A specific circuit arrangement andd control by means of which one improved method in accordance with the invention can be carried out is illustrated in FIG. 4. In this view, there are shown the rectifier station 6 and the inverter station 7, which stations are each connected to a three-phase alternating current system 1 and 2, respectively by power transformers 10 and 11, respectively. The power transformer 10 is provided with a tapping step switch which permits the control of its secondary voltage. The two stations 6, 7 are well known 3-phase converter bridges with valves consisting of a series of silicon-controlled rectifiers. The valves are controlled respectively by controller devices 12, 13. The controller device 12 is controlled by a current regulator 14 which operates in accordance with a current difference $\Delta i$ which is formed by an operational amplifier 15 that compares an actual direct current value $I_{act}$ and a reference direct current value $I_{ref}$. The actual direct current value $I_{act}$ is formed by a current transformer 16 which is connected into the direct current connection line between the two stations 6, 7. The reference direct current value is formed by the power factor difference $\Delta p.f.$ and is amplified by an amplifier 17 which is connected to the output of an operational amplifier 18 which compares an actual power factor $p.f_{act}$ and a reference power factor value $p.f_{ref}$. The actual power factor value $p.f_{act}$ is formed by a power factor measuring device 19 connected to the three-phase a.c. system 2. The reference power factor value $p.f._{ref}$ is formed by the constant output of a power source 20. The reference value ($p.f._{ref}$) for the power factor is selected in such manner that its argument $\phi$ (where $p.f. = \cos \phi$) corresponds to an angle of inclination $\phi = $ arc (p.f.) for a line "b" with the optimum operation range as established in FIG. 2 by the hatched margins.

Controller device 13 is controlled by a voltage regulator 21 which is connected to the output of an operational amplifier 22 which compares an actual direct voltage value $V_{act}$ and a reference voltage value $V_{ref}$. The reference direct voltage value $V_{ref}$ is formed by the constant output of power source 25, and the actual voltage value $V_{act}$ is formed by the output of a voltage transformer 23 connected into the connection line between the two stations 6, 7. Between current transformer 16 and voltage transformer 23 there is connected a reactor 24 for smoothing the d.c. current between the two stations 6, 7. The reference direct voltage $V_{ref}$ is selected according to a line "b" for $V_{act} = V_{ref} = $ const, as depicted in FIG. 2 so that the optimum operation range of the inverter-rectifier station will be attained.

The three-phase a.c. system 1 is provided with a regulated phase shifter 5 and the three-phase a.c. system 2 is provided with a condenser battery 8.

In conclusion, the advantages of the improved regulating method in accordance with the invention are.

1. Since the HV-DC short coupling takes over the regulation of the voltage, or of the power factor on the bus bar of the fed network, no regulable phase shifter is required to be installed there; rather only a condenser battery and/or filter circuits in order to so vary the reactive power with varying active power that either, for example, a constant power factor is achieved, or the three-phase voltage is kept constant, or brought into the desired dependence on the active power, or other operating variables.

2. Since the HV-DC regulation acts on the gate control of the converter valves, it can act much faster than a correspondingly regulated rotating phase shifter in fluctuations of the three-phase voltage, or variation of the load and thus of the power factor.

3. The losses with use of a condenser battery are lower than with a phase shifter. Consequently, the total efficiency is improved.

We claim:

1. The method for regulating the power factor of a first 3-phase network fed with power from a second 3-phase network via a short high-voltage direct current transmission link interconnecting the two networks and wherein power is supplied to said first network by rectification of the alternating current from said second network at a rectifier station located at one end of said direct current link and inversion of the direct current to alternating current at an inverter station located at the other end of said direct current link and operable with a leading power factor, which comprises the steps of:
    measuring the actual power factor of said first network,
    comparing the measured power factor with a constant reference power factor to produce a first control quantity variable with the difference therebetween,
    regulating the direct current at one of said stations in accordance with said first control quantity,
    measuring the direct current voltage on said interconnecting link,
    comparing said measured voltage with a constant reference voltage to produce a second control quantity variable with the difference therebetween, and
    regulating the voltage at the other station in accordance with said second control quantity
    whereby the amount of leading reactive power delivered by said inverter station is determined by the respective magnitudes of said reference power factor and reference voltage.

2. Apparatus for regulating the power factor of a first 3-phase nerwork with power from a second 3-phase network via a short high-voltage direct current transmission link interconnecting the two networks which comprises a rectifier station connected to said second network at one end of said interconnecting link for converting the alternating current from said second network into a high voltage direct current, an inverter station connected to said first network at the opposite end of said interconnecting link and which is operable at a leading power factor for inversion of the high voltage direct current into alternating current, said rectifier and inverter stations being each constituted by a 3- phase arrangement of controllable valves each having control means provided therefor, means connected to said first network for measuring the actual power factor thereof and producing an output variable therewith, means providing a first constant reference output representing a selectable reference value of that power factor desired to be maintained, means comparing said outputs and producing a first control output therefrom variable with the sense and amplitude of the difference between the actual and reference power factors, means connected to said interconnecting link for producing a second control output variable with the amplitude of the direct current in said interconnecting link, means comparing said first and second control outputs and producing therefrom an output variable with the sense and amplitude of the difference therebetween and which is fed to said control means for said rectifier station for regulating the current output thereof, means connected to said interconnecting link for producing a third control output variable with the amplitude of the direct voltage of said interconnecting link, means providing a second constant reference output representing a selectable value of the voltage on said interconnecting link, and means comparing said third control output with said second constant reference output and producing an output variable with the sense and amplitude of the difference therebetween and which is fed to said control means for said inverter station for regulating the voltage thereby to regulate the amount of leading reactive power delivered by said inverter station to said first 3-phase network.

3. Apparatus as defined in claim 1 wherein a power transformer is provided for connecting said second network to said rectifier station, said power transformer including a tapping switch for regulating the power factor in said second network.

* * * * *

UNITED STATES PATENT OFFICE
CERTIFICATE OF CORRECTION

PATENT NO. : 3,949,291
DATED : April 6, 1976
INVENTOR(S) : KARL-WERNER KANNGIESSER AND DIETRICH KLUGE It is certified that error appears in the above-identified patent and that said Letters Patent are hereby corrected as shown below:

Column 3, line 63 after "values" insert

-- $i_{ref}$ and $v_{ref}$ -- line 65, "V" should have read

-- v -- line 67 change "$V_{act}$ and $I_{act}$" to

-- v and i --

Column 4, line 25 change "nominal active" to

-- reference --

Figs. 2 and 3 or the drawings should appear as shown on the attached sheet.

Signed and Sealed this

Twenty-ninth Day of November 1977

[SEAL]

Attest:

RUTH C. MASON
*Attesting Officer*

LUTRELLE F. PARKER
*Acting Commissioner of Patents and Trademarks*